(12) United States Patent
Nilsen et al.

(10) Patent No.: US 6,315,091 B1
(45) Date of Patent: Nov. 13, 2001

(54) BRAKE COOLING SYSTEM

(75) Inventors: Steven A Nilsen, Madison Heights; Stefano Frascaroli, Waterford; Brian R Johnson, Fenton; Raymond J VanAssche, Utica; Mark A Swartz, Rochester Hills; Bryan E Nesbitt, Auburn Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/466,586

(22) Filed: Dec. 17, 1999

(51) Int. Cl.[7] ..................................................... F16D 65/78
(52) U.S. Cl. .................... 188/264 A; 301/6.3; 188/71.6; 188/264 R
(58) Field of Search ................... 188/264 A, 264 AA, 188/71.6, 264 R; 301/6.3, 6.4; 296/180.1, 208

(56) References Cited

U.S. PATENT DOCUMENTS

| | | |
|---|---|---|
| 3,624,437 | 11/1971 | Hoyler . |
| 3,624,438 | 11/1971 | Hoyler . |
| 3,664,467 | 5/1972 | Lucien et al. . |
| 3,983,974 | 10/1976 | Dowell et al. . |
| 4,013,146 | 3/1977 | Gebhardt et al. . |
| 4,139,081 | 2/1979 | Klaue . |
| 4,164,993 | 8/1979 | Kobelt . |
| 4,503,944 | 3/1985 | Burckhardt et al. . |
| 4,592,452 | 6/1986 | Merle . |
| 4,620,616 | 11/1986 | Martin . |
| 4,653,788 | * 3/1987 | Di Gusto . |
| 4,667,760 | 5/1987 | Takimoto . |
| 4,772,299 | * 9/1988 | Bogusz ................. 188/71.6 |
| 4,805,747 | * 2/1989 | Moedinger et al. .......... 188/264 AA |
| 4,810,021 | * 3/1989 | Burst ................. 296/208 |
| 4,903,801 | 2/1990 | Kobelt . |
| 4,979,597 | * 12/1990 | Mehlitz ......................... 188/264 AA |
| 5,007,509 | 4/1991 | Koizumi . |
| 5,121,818 | * 6/1992 | McComic ..................... 188/264 AA |
| 5,284,227 | 2/1994 | Pelfrey . |
| 5,317,880 | 6/1994 | Spears . |
| 5,492,205 | 2/1996 | Zhang . |
| 5,511,847 | * 4/1996 | Weisbarth et al. ................ 296/180.1 |
| 5,954,405 | * 9/1999 | Toman .................................. 301/6.3 |
| 6,116,365 | * 9/2000 | Preiss et al. ......................... 180/68.1 |

* cited by examiner

*Primary Examiner*—Douglas C. Butler
*Assistant Examiner*—Robert A. Siconolfi
(74) *Attorney, Agent, or Firm*—Mark P. Calcaterra

(57) ABSTRACT

The present invention provides a brake cooling system for cooling vehicle brakes having a fascia for mounting in a front area of the vehicle. The fascia has at least one aperture therein for allowing air to pass therethrough. The aperture has a first aperture side opposing a second aperture side. The brake cooling system further has a channel structure communicating with the aperture to allow the air to pass through the channel structure. The channel structure extends back from the fascia and has a first channel side opposing a second channel side. The channel structure is constructed to channel air from the aperture to the vehicle brakes when the vehicle is moving in a forward direction.

8 Claims, 2 Drawing Sheets

BRAKE COOLING SYSTEM

FIELD OF THE INVENTION

The present invention relates to a brake cooling system, and more particularly, to a brake cooling system which channels air to vehicle brake elements to dissipate heat energy.

BACKGROUND OF THE INVENTION

In conventional vehicles, such as automobiles, brake elements are used to slow and stop vehicle movement. These brake elements many times comprise a rotor, attached to the vehicle's wheels, having calipers positioned in a clamping arrangement about surfaces of the rotor. When stopping is desired, hydraulic pressure from a master cylinder element is supplied to the caliper, thereby causing the caliper to clamp the rotor element. This clamping causes brake pads positioned between the rotor element and the caliper to frictionally engage the rotor, thereby creating resistance on the rotor. This resistance slows the rotation of the rotor and attached wheel, thereby slowing the vehicle. While this type of braking device satisfactorily slows the vehicle's movement, the frictional engagement of the brake pads against the rotor generates an enormous amount of heat energy. This heat energy causes heating of the brake element. If this heat is not properly dissipated from the brake element, severe damage to the braking system can ensue.

Manufacturer's have attempted to overcome this problem by providing air passages in the vehicle to channel air to the brake element. This channeling acts to blow air across the brake element, thereby dissipating the heat buildup in the brake element. One such channeling device is disclosed in U.S. Pat. No. 4,805,747 entitled "Arrangement for Supplying Cooling Air to a Brake Disk" which is hereby incorporated by reference. This reference generally discloses a duct configuration which channels air from the lower part of a vehicle to a vehicle's brake element. While this device does provide enhanced cooling characteristics of the brake element, it has several drawbacks.

First, the '747 duct construction draws air from the bottom of the vehicle and does not utilize the high pressure air acting on the front of the vehicle to divert substantial air velocity for channeling across the vehicle brakes. Second, the '747 invention requires extra duct work to be constructed and installed for its channeling device. This extra construction increases the overall cost of the vehicle. Moreover, its placement in the vehicle reduces the amount of available room for other components to be positioned therein. The present invention was developed in light of these drawbacks.

SUMMARY OF THE INVENTION

It is therefore an object of the present invention to provide a brake cooling system which utilizes the ram air affect of the front of a vehicle.

It is yet another object of the present invention to provide a brake cooling system having a duct work configuration constructed to channel air to a brake system while reducing the number of additional parts to be manufactured for the vehicle.

To accomplish these and other objects, the present invention provides a brake cooling system for cooling vehicle brakes having a fascia for mounting in a front area of the vehicle. The fascia has at least one aperture therein for allowing air to pass therethrough. The aperture has a first aperture side opposing a second aperture side. The brake cooling system further has a channel structure communicating with the aperture to allow the air to pass through the channel structure. The channel structure extends back from the fascia and has a first channel side opposing a second channel side. The channel structure is constructed to channel air from the aperture to the vehicle brakes when the vehicle is moving in a forward direction.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
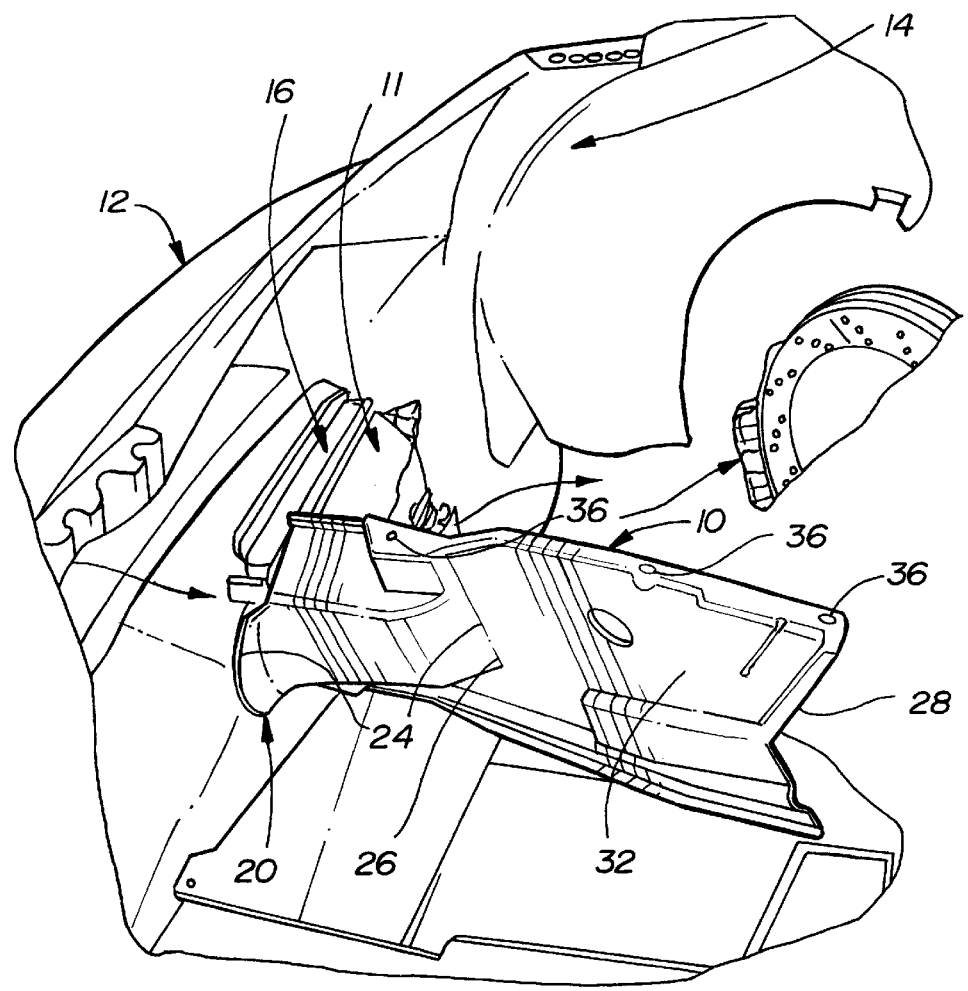
FIG. 1 is a perspective view of a brake cooling system according to the present invention.

Referring now to FIG. 1, a brake cooling system according to the present invention is shown and described. In FIG. 1, a brake cooling system is shown having a first channel side 10, second channel side 11, and a front fascia 12. Front fascia 12 has a fog lamp assembly 16 for illuminating objects in front of the vehicle. Adjacent to fog lamp 16 is an aperture 18 (see FIG. 2) sized to communicate with and thereby allow air flow into the frontal area 20 of first channel side 10.

First channel side 10 has a frontal area 20 positioned behind front fascia 12 and shaped to minimize damage in low speed impacts. First channel side 10 can be any shaped material which conducts air therealong, Preferably, however, first channel side 10 has a first portion 24 which begins at aperture 18 and extends back to crease 26. Below first portion 24 and extending from crease 26 to a termination edge 28 is second portion 32. Second portion 32 is a generally flat plane or surface. Besides use for the present invention, second portion 32 is preferably designed to deflect material projected toward the vehicle engine compartment from the road. Likewise, although shaped for channeling air (as will be discussed), first portion 24 also preferably deflects debris projected from the road toward the engine compartment of the vehicle. As a result any need for installation of a separate engine shield is eliminated, thereby reducing the number of components required by the vehicle.

Preferably, first channel side 10 has an upper flat area 34 shaped at a 90 degree angle from the planar surface of second portion 32. Upper flat 34 has a plurality of apertures 36 which serve as passages for fastening members such as bolts. These fastening members secure first channel side 10 to a frame rail (not shown).

Figure 2:
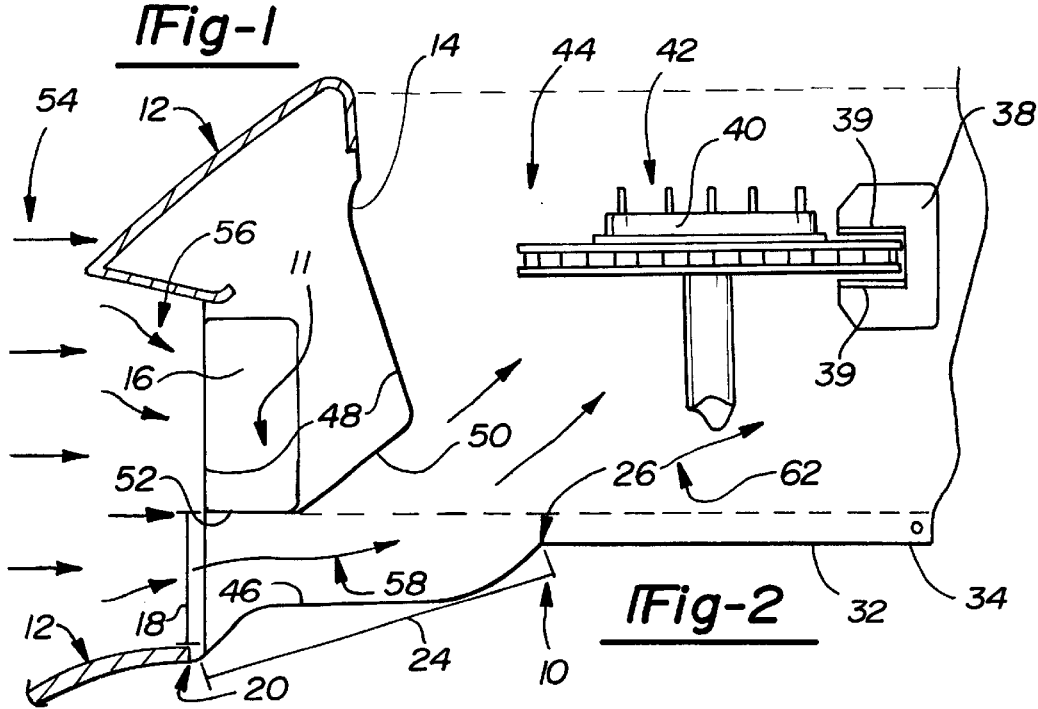
FIG. 2 is a cross-sectional view taken through a horizontal section of a brake cooling system according to the present invention.

Referring now to FIG. 2, first portion 24 of first channel side 10 is shown in greater detail. Here, it can be seen that first portion 24 begins at frontal area 20 and extends back from front fascia 12 in a convex fashion until reaching midpoint 46. Thereafter, first portion 24 transitions back toward crease 26 in a concave fashion. At crease 26, first channel side 10 transitions into second portion 32 which bends back and away from first portion 24.

With continued reference to FIG. 2, the specific structural design of the braking system 42 is shown and described. In FIG. 2, the vehicle braking system 42 is shown generally comprising caliper 38 positioned around rotor 40. Vehicle braking system 42 is positioned within a wheel housing 44 which is bounded by splash shield 14 and first channel side 10. When actuated, caliper 38 presses brake pads 39 against the outer surface of rotor 40. The frictional engagement of brake pads 39 cause rotation of rotor 40 to slow. Since the vehicle's wheels are operationally engaged to rotor 40, the vehicle is slowed.

With continued reference to FIG. 2, second channel side 11 is shown and described. Generally, second channel side 11 comprises any surface which directs air from fascia 12 back to brake system 42. Preferably, however, second channel side 11 comprises an end portion 50 of splash shield 14 and one side 52 of fog lamp 16. By recycling these elements for use in the present application, the number of overall components as well as the overall cost and weight of the vehicle are reduced.

With continued reference to FIG. 2, the operation of the present invention is now described. As a vehicle containing the brake cooling system moves in a forward direction, air current represented by vector cluster 54 moves in a relative fashion as shown with respect to front fascia 12. Once in proximity of front fascia 12, these wind currents act as shown with vector cluster 56 and are channeled towards aperture 18. Once inside aperture 18, second channel side 11 and first portion 24 act to channel air currents as illustrated by vector 58 toward vehicle braking system 42. At crease 26, second portion 32 bends away from first portion 24, thereby allowing separation of air flow (represented by vector 58) from first channel side 10. This separation allows air to be blown upon vehicle braking system 42 as represented by vector cluster 62. As shown by vector cluster 62, this blowing action acts in a spread out fashion primarily due to the bending away of second portion 32 from first portion 24. This blowing action cools vehicle braking system 42.

Figure 3:
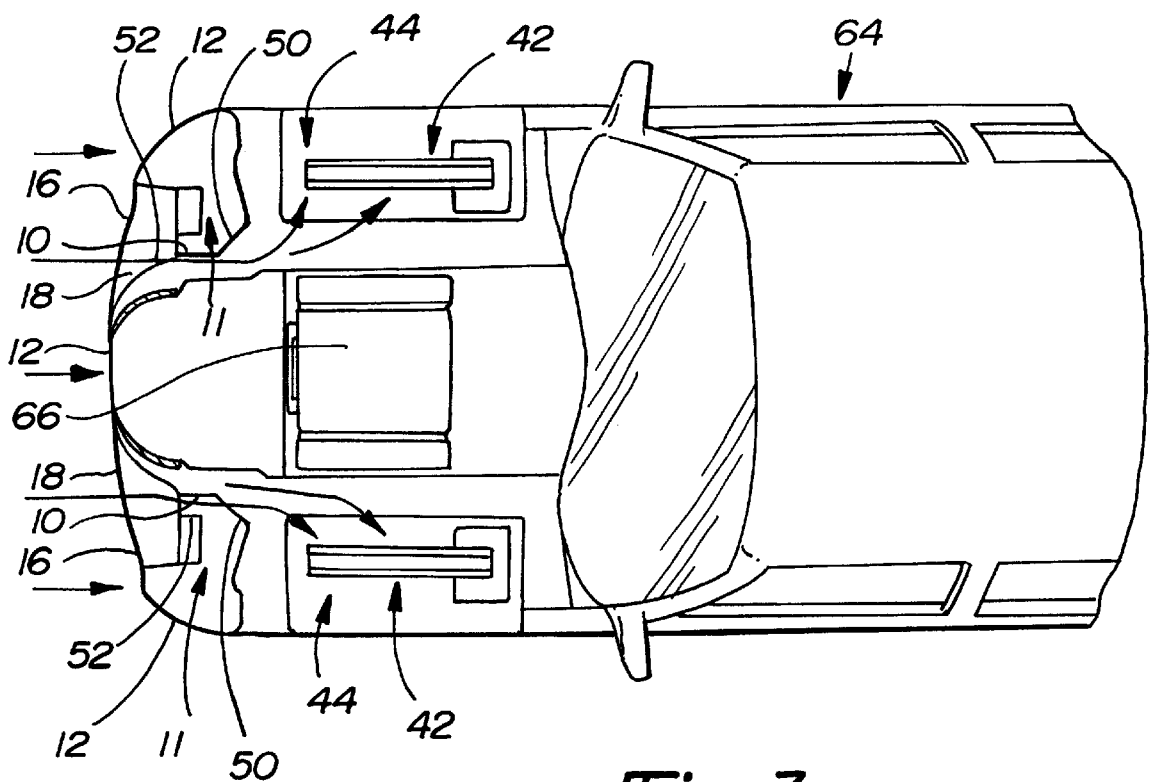
FIG. 3 is a partial schematic view of the front end of a vehicle utilizing a brake cooling system according to the present invention.

Referring now to FIG. 3, a vehicle 64 is shown having a pair of vehicle braking systems 42 contained within respective wheel housings 44. First channel sides 10 are shown positioned in communication with fog lamps 16, apertures 18, and front fascia. 12. Second channel sides 11 is shown consisting of end portion 50 and one side 52 of fog lamp 16. As is readily seen in FIG. 3, first channel side 10 provides a barrier between wheel housing 44 and motor compartment 66.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A brake cooling system for cooling vehicle brakes, said brake cooling system comprising:
    a fascia for mounting in a front area of said vehicle, said fascia having at least one aperture therein for allowing air to pass therethrough;
    a channel structure communicating with said aperture to allow said air to pass through said channel structure, said channel structure extending back from said fascia, said channel structure having a first channel side opposing a second channel side, said channel structure constructed to channel air from said aperture to said vehicle brakes when said vehicle is moving in a forward direction;
    wherein said first channel side has a first portion which transitions from a convex shaped section to a concave shaped section, said convex shaped section being adjacent to said fascia;
    wherein said first channel side has a second portion which extends back from said first portion, said second portion being substantially planar; and
    wherein said second portion is angled away from said first portion to allow separation of air from said first portion.

2. A brake cooling system as claimed in claim 1, further comprising a fog lamp having a side proximate said aperture, said side proximate said aperture forming a portion of said second channel side.

3. A brake cooling system as claimed in claim 1, wherein said second channel side is a portion of a splash shield.

4. A brake cooling system for cooling vehicle brakes, said brake cooling system comprising:
    a fascia for mounting in a front area of said vehicle, said fascia having at least one aperture therein for allowing air to pass therethrough;
    a channel structure communicating with said aperture to allow said air to pass through said channel structure, said channel structure extending back from said fascia, said channel structure having a first channel side opposing a second channel side, said channel structure constructed to channel air from said aperture to said vehicle brakes when said vehicle is moving in a forward direction;
    wherein said first channel side has a first portion which transitions from a convex shaped section to a concave shaped section, said convex shaped section being adjacent to said fascia;
    wherein said first channel side has a second portion which extends back from said first potion, said second portion being substantially planar; and
    wherein said first portion and said second portion form an engine shield.

5. A brake cooling system as claimed in claim 4, further comprising a fog lamp having a side proximate said aperture, said side proximate said aperture forming a portion of said second channel side.

6. A brake cooling system as claimed in claim 4, wherein said second channel side is a portion of a splash shield.

7. A vehicle having two front wheel housings, said vehicle equipped with a braking system which implements braking by engaging friction elements located within said wheel housings, said vehicle comprising:
    a front fascia having a pair of apertures for allowing air to pass therethrough; and
    a pair of channel structures communicating with said apertures to allow said air to pass through said channel structures, each said channel structure extending back from said fascia, each said channel structure having a first channel side opposing a second channel side, each said channel structure constructed to channel air from a respective aperture to said friction elements when said vehicle is moving in a forward direction;

wherein said first channel sides have a first portion which transitions from a convex shaped section to a concave shaped section, said convex shaped section being adjacent to said aperture in said fascia;

wherein said first channel sides have a second portion which extends back from said first portion, said second portion being substantially planar; and wherein said second portion is angled away from said first portion to allow separation of air from said first portion.

8. A brake cooling system as claimed in claim 7, wherein said first portion and second portion form an engine shield.

* * * * *